United States Patent [19]

Lee

[11] Patent Number: 4,853,452

[45] Date of Patent: Aug. 1, 1989

[54] NOVEL SOLUBLE POLYIMIDESILOXANES AND METHODS FOR THEIR PREPARATION USING A FLOURINE CONTAINING ANHYDRIDE

[75] Inventor: Chung J. Lee, Amherst, N.Y.

[73] Assignee: Occidental Chemical Corporation, Niagara Falls, N.Y.

[21] Appl. No.: 153,898

[22] Filed: Feb. 9, 1988

[51] Int. Cl.$^4$ .......................... B05D 3/02; C08F 2/46; C08G 77/04

[52] U.S. Cl. .......................... 528/26; 528/28; 528/32; 525/421; 525/424; 525/426; 525/474; 525/477; 525/478; 525/479; 524/588; 524/600; 524/104; 524/113; 524/323; 524/356; 524/378; 428/447; 428/450; 428/458; 428/473.5

[58] Field of Search .............. 525/477, 474, 479, 421, 525/426, 424, 478; 528/26, 28, 32; 428/473.5, 447, 450, 458; 524/588, 600

[56] References Cited

U.S. PATENT DOCUMENTS

| | | | |
|---|---|---|---|
| 3,325,450 | 6/1967 | Holub | 528/26 |
| 3,424,718 | 1/1969 | Angelo | 528/28 |
| 3,553,282 | 1/1971 | Holub | 528/21 |
| 3,847,867 | 11/1974 | Heath et al. | 528/208 |
| 4,290,936 | 9/1981 | Sasaki et al. | 528/183 |
| 4,395,527 | 7/1983 | Berger | 528/26 |
| 4,404,350 | 9/1983 | Ryang | 528/26 |
| 4,480,009 | 10/1984 | Berger | 528/83 |
| 4,520,075 | 5/1985 | Igarashi et al. | 528/125 |
| 4,586,997 | 5/1986 | Lee | 528/26 |
| 4,588,804 | 5/1986 | Fryd | 528/172 |
| 4,603,061 | 7/1986 | St. Clair et al. | 428/336 |
| 4,612,361 | 9/1986 | Peters | 528/26 |
| 4,634,760 | 1/1987 | Takekoshi et al. | 528/353 |
| 4,670,497 | 6/1987 | Lee | 525/426 |
| 4,686,147 | 8/1987 | Matsuyama et al. | 428/447 |

FOREIGN PATENT DOCUMENTS 58-1361 1/1983 Japan.
58-7473 1/1983 Japan.

OTHER PUBLICATIONS

V. H. Kuckertz, Macromol. Chem., 98, 1966, pp. 101–108.
McGrath et al., Polymer Preprints, 27(2), 1986, p. 403.
Chem. Abstracts CA:62 14585b (1965)/published 12/18/64.
Copending application Ser. No. 032,722, filed Mar. 31, 1987.
Copending application Ser. No. 154,168, filed Feb. 9, 1988.

*Primary Examiner*—Morton Foelak
*Assistant Examiner*—Frederick Krass
*Attorney, Agent, or Firm*—James F. Tao; James F. Mudd

[57] ABSTRACT

Substantially fully imidized polyimidesiloxanes which are based on 6FDA and optionally also a mixture of a biphenyl tetracarboxylic dianhydride and a benzophenone tetracarboxylic dianhydride, are soluble in diglyme which gives them particular utility in the microelectronics industry. The polymers are prepared from the mixture of dianhydrides, a difunctional siloxane monomer and an organic diamine. Diamines can be used to provide an asymmetrical structure in the polyimidesiloxane polymer chain. The polyimidesiloxane can be prepared with functional groups which render them directly curable. The polyimidesiloxanes can also be prepared with functional groups which when reacted with an unsaturated compound renders the polymers curable. The product of the invention can be used in the form of solutions in the micro-electronic industry. The polymers can also be used in wire and cable coating and to prepare films, fibers, and molded and extruded articles.

71 Claims, No Drawings

NOVEL SOLUBLE POLYIMIDESILOXANES AND METHODS FOR THEIR PREPARATION USING A FLOURINE CONTAINING ANHYDRIDE

BACKGROUND OF THE INVENTION AND INFORMATION DISCLOSURE STATEMENT

A class of polymers known as polyimides has become known for its combination of good heat stability and high upper use temperatures, as measured by glass transition temperature. A particularly useful type of such polyimides is known as polyimidesiloxanes.

Because of their combination of properties, polyimidesiloxanes have been used in electronic applications, particularly in microelectronic components in the computer industry.

Because most of the previously known polyimidesiloxanes are insoluble or difficulty soluble in solvents, when used in the microelectronics industry, there is a great need for polyimidesiloxanes having improved solubility characteristics, as well as a better balance of heat resistance and upper use temperature.

The chemistry for making polyimides has been well-known since about 1960. A structurally simple polyimide can be prepared by reacting a diamine with a dianhydride.

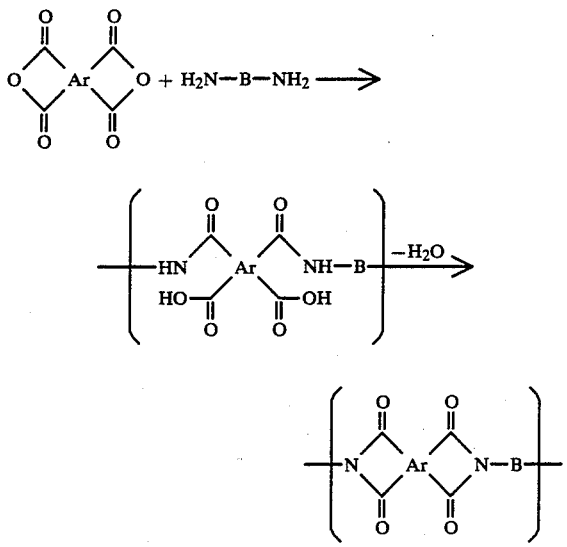

The first step, or the polycondensation reaction, generates polyamide acids which are hydrolytically unstable even at room temperature. The second step, or the imidization reaction, produces the stable polyimides desired for various applications.

Polyimidesiloxanes can be prepared by reactions employing siloxane diamines or siloxane dianhydrides with organic comonomers. Polyimidesiloxanes can also be prepared from siloxane diamines and siloxane dianhydrides without an organic comonomer.

The first polyimidesiloxane was prepared by reacting pyromellitic dianhydride (PMDA) with 1,3-bis-(aminopropyl)-1,1,3,3-tetramethyl disiloxane in 1966 (see V. H. Kuckertz, *Macromol. Chem.* 98, 1966, pp. 101–108). This polyimidesiloxane is a crystalline material and cannot be cast into flexible films from solvent. Polyimidesiloxanes derived from reactions of benzophenone tetracarboxylic dianhydride (BTDA) and α,w-diamino organo-polysiloxanes were disclosed by General Electric in 1967 in U.S. Pat. No. 3,325,450. Polyimidesiloxanes containing an α,w-diamino organopolysiloxane and a diether dianhydride (DEDA) have also been disclosed in U.S. Pat. No. 3,847,867.

All these BTDA and DEDA containing polyimidesiloxanes are amorphous materials. They have a glass transition temperature of no more than 100° C. and, therefore, have very limited upper use temperatures, despite the excellent thermal stability of these polymers up to about 200° C.

Polyimidesiloxanes containing both organic and siloxane monomers have been reported from PMDA copolymers (see Japan Kokai Tokkyo Koho 83/7473 and 83/13631); for BTDA containing copolymers (U.S. Pat. Nos. 3,553,282 and 4,404,350) and for diether dianhydride containing copolymers (U.S. Pat. No. 3,847,867). These PMDA containing polyimidesiloxanes are not soluble in any solvent. The BTDA containing polyimidesiloxanes are only soluble in high boiling or toxic solvents such as 1-methyl-2-pyrrolidinone, commonly known as N-methyl pyrrolidone (NMP), phenol or cresol, and the like. The diether dianhydride containing polyimidesiloxane, in addition, are also soluble in chlorinated solvents such as dichlorobenzene and dichloromethane. Since these phenol and chlorinated compounds are both corrosive and highly toxic, the polyimidesiloxanes have limited application in coating applications, especially in heat sensitive electronic devices. This is also due to the fact that a NMP soluble polyimidesiloxane normally has to be heated to 350° C. for at least half an hour to remove all the residual solvent in a film having a micron-thickness film.

Only a few polyimidesiloxanes are soluble, even in high boiling and relatively toxic solvents, such as 1-methyl-2-pyrrolidinone (NMP), despite the fact that most of their polyamide acids are soluble. The usage of polyamide acids in coating applications has many drawbacks. First, a subsequent imidization reaction on substrates produces water. Therefore, it can only be used in very thin film coatings and where void-free property is not critical to performance. Second, the removal of high boiling, polar solvents, such as NMP, requires temperatures as high as 350° C. for about 30 minutes even for films of a micron thickness. This drying process is not only energy intensive, but also unacceptable to some heat sensitive electronic devices or substrates. In addition, the polyamide acids solution has to be stored at refrigeration temperature ($<4°$ C.) and it still has a very short shelf life (about 3 months). Finally, only the fully imidized polyimidesiloxanes are thermally stable for melt processing such as extrusion and injection molding. A soluble polyimidesiloxane can be fully imidized at temperatures of about 160° to 170° C. in a solvent, whereas imidization for insoluble polyimidesiloxanes in the solid state may require temperatures 50° C. above their glass transition temperatures which can be as high as 200° to 250° C. Shaping not fully imidized polyimidesiloxanes by the melt processing method produces voids in the products and often is not desirable.

U.S. Pat. No. 4,290,936 describes preparation of a polyimide by reacting a biphenyl tetracarboxylic acid and an aromatic diamine ingredient containing at least 50 percent of diamino-diphenyl ether in the presence of a phenol or halogenated phenolic compound. Additional diacids including benzophenonetetracarboxylic acids can also be employed. Siloxanes are not disclosed so that polyimidesiloxanes are not produced.

U.S. Pat. No. 4,520,075 describes a diglyme soluble polyimidesiloxane which is based on biphenyl tetracarboxylic dianhydride and where the polyimidesiloxane is partially imidized. The corresponding polyamic acid and fully imidized products are insoluble. The polyimidesiloxane precursors, when used in coating applications, have to be imidized and solvent removed at temperatures as high as 350° C. or 400° C. for 30 minutes. The usage of high temperatures limited their applications in heat sensitive semiconductor devices, as well as hydrid circuitry. In addition, these precursors are hydrolytically unstable at room temperatures and have only limited shelf life even at 4° C. refrigeration temperature for about 3 months. Furthermore, these precursors during imidization produce water or bubbles in coatings when the film thickness is over a few micron meters ($\gtrsim 20$ $\mu$m). The polyimidesiloxane precursors are not useful in thin film applications. The diaminosiloxane is used in an amount of 1 to 4 mole percent of the total diamino compound. Normal usage is at least about 15 mole percent of the siloxane component based on the total diamino components up to as high as 60 mole percent.

U.S. Pat. No. 4,634,760 is directed to polyimides based on biphenyl tetracarboxylic dianhydride and a second anhydride which may be a benzophenone tetracarboxylic dianhydride; an oxydiphthalic anhydride, or various other dianhydrides disclosed at column 1, line 60 to column 3, line 5 of the patent. The patent discloses the use of various diamines including 1,3-bis(3-aminopropyl)tetramethyldisiloxane, but there is no disclosure of making diglyme soluble polyimidesiloxanes.

Some diether dianhydride containing polyimidesiloxanes, such as disclosed in U.S. Pat. Nos. 4,586,997 and 4,670,497, are soluble in diglyme ($T_b = 162°$ C.) and may be sparingly soluble in tetrahydrofuran ($T_b = 60°$ C.); but none of these polyimidesiloxanes are soluble in solvents such as methyl ethyl ketone ($T_b = 80°$ C.) which is one of the most used solvents in the coating industries. However, all these polyimidesiloxanes have relative low glass transition temperatures (below about 125° C. to 150° C.) and limited thermal stability (350° C./0.5 hour with retention of film flexibility and integrity). Thermally stable polyimidesiloxanes which are soluble in non-toxic and low boiling solvents such as diglyme or methyl ethyl ketone, are not readily available from these diether dianhydrides.

U.S. Pat. No. 4,395,527 to Berger discloses a large number of various components as useful in manufacturing polyimidesiloxanes. Both BPDA and BTDA are disclosed in this patent as useful dianhydrides, but other investigators such as the patentees of U.S. Pat. Nos. 4,520,075 and 4,634,760, have shown that the use of BPDA and BTDA individually does not lead to polyimidesiloxanes that are soluble in diglyme. Moreover, the tolylene diamine used in the present invention is not even disclosed in th cited patent.

U.S. Pat. Nos. 4,586,997 and 4,670,497 teach the utility of making polyimidesiloxanes based on diether dianhydrides, diamines and $\alpha$,w-diaminosiloxanes. The use of benzophenone tetracarboxylic acid dianhydride (BTDA) is disclosed, but the illustrative examples show that polyimides based on BTDA are not soluble in diglyme. Cross-linked polymers are also disclosed.

The following three U.S. patents disclose the use of the compound 2,2-bis(3',4'-dicarboxyphenyl)hexafluoropropane dianhydride (6FDA) in the preparation of polyimides.

U.S. Pat. No. 3,424,718 in Example 5, discloses the preparation of a polyimide by reacting the compound 6FDA and pyromellitic dianhydride with two diamines. This appears to be a specific teaching so that the patent does not disclose the use of 6FDA along or any other mixtures with 6FDA. No siloxane is disclosed so that no polyimidesiloxane is disclosed.

In U.S. Pat. No. 4,588,804, a polyimide is prepared by reacting preferably two dianhydrides with an organic amine. The first of the dianhydrides which can be present in an amount from 50 to 100 mole percent, has a bridging member which is a divalent moiety which prevents conjugation between the anhydride-bearing ring, and which contains no aliphatic carbon-carbon or carbon-hydrogen bonds. Such requirements are fulfilled by the compound 6FDA. The other dianhydride which may be present has a bridging member which may be a divalent moiety containing no aliphatic carbon-carbon or carbon-hydrogen bonds. Such requirements are fulfilled by benzophenone dicarboxylic dianhydride (BTDA). The compositions require a diamine having specific requirements. No siloxane compound is disclosed os that the patent does not teach the preparation of polyimidesiloxanes.

U.S. Pat. No. 4,612,361 discloses the preparation of a polyimide having the formula $(A)_m(B)_{1-m}$, wherein A is an aromatic bis(etheranhydride) having the characteristic —OZO— bridge. A host of such compounds is disclosed in the patnt at column 6, lines 29–44. The component B is a 6F-dianhydride (6FDA). Background disclosure is given in the patent at column 6, lines 45–68. The composition is made by the reaction of the anhydrides with an organic diamine such as disclosed at column 7, line 5 to column 8, line 14. The compound bis(4-aminobutyl)tetramethyldisiloxane is incidentally disclosed at column 8, line 12.

My copending application Ser. No. 032,722, filed Mar. 31, 1987, discloses that fully imidized polyimidesiloxanes made from oxydiphthalic anhydrides are soluble in solvents such as diglyme, tetrahydrofuran and methyl ethyl ketone.

My copending application Ser. No. 154,168 filed on even date herewith, discloses that substantially fully imidized polyimidesiloxanes made from a mixture of a biphenyl tetracarboxylic dianhydride and a benzophenone tetracarboxylic dianhydride are soluble in solvents such as diglyme, tetrahydrofuran and methyl ethyl ketone.

One of the objects of the present invention is to develop a fully imidized polyimidesiloxane which is soluble in low boiling, non-polar and non-toxic solvent such as diglyme. Another object of the present invention is to develop the desirable polyimidesiloxanes based on less expensive and commercially available organic monomers. Another object of the present invention is to develop less expensive polyimidesiloxane which can be quickly scaled-up into commercially available, large scale production. Another object of the present invention is to develop less expensive polyimidesiloxanes which can be used in price sensitive applications or in favorable competitive performance/cost positions in cable jacket, as well as 3D molded wire board applications and where high volume and low price are essential.

Another object of the invention is to provide fully imidized polyimidesiloxanes which are soluble not only in high boiling solvents, such as NMP, but also in low boiling, low toxic, less polar solvents such as diglyme or tetrahydrofuran (THF). A further object of the invention is to provide polyimidesiloxanes that have a good balance of heat resistance and high upper use temperatures, as measured by glass transition temperatures.

A further object of this invention is to provide polyimidesiloxanes that have a low dielectric constant.

Another object of this invention is to produce curable and cross-linked polyimidesiloxanes.

SUMMARY OF THE INVENTION

Substantially fully imidized polyimidesiloxanes which are based on bis(dicarboxylphenyl)hexafluoropropane dianhydrides which have the formula

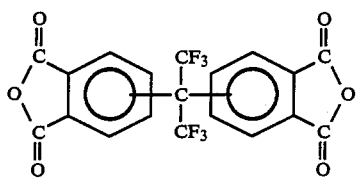

are soluble in diglyme which gives them particular utility in the micro-electronics industry. The polymers are prepared from the dianhydride, a difunctional siloxane monomer and an organic diamine that preferably provides an asymmetrical structure in the polyimidesiloxane polymer chain.

The fluorinated dianhydrides can be used in admixtures with other dianhydrides such as the oxydiphthalic anhydrides and the biphenyl tetracarboxylic dianhydrides. The dianhydride component must be capable of providing polyimidesiloxanes that are soluble in diglyme.

The polyimidesiloxanes of the invention can be prepared with functional groups which render them directly curable. The polyimidesiloxanes can also be prepared with functional groups which when reacted with an unsaturated compound renders the polymers curable.

The products of the invention can be used in the form of solutions in the micro-electronic industry. The polymers can also be used in wire and cable coating and to prepare films, fibers, and molded and extruded articles.

DETAILED DESCRIPTION OF THE INVENTION

The Organic Anhydrides

The present invention is based on the discovery that the use of the bis(dicarboxylphenyl)hexafluoropropane dianhydrides (6FDA) provides fully imidized polyiminesiloxanes which ave a unique combination of solubility and thermal properties.

The 2,2-bis(3',4'-dicarboxyphenyl)hexafluoropropane dianhydride (2,2-3',4'-F6DA) is a known compound reported to be useful in making pyromellitic dianhydride based copolymers. See, for example, U.S. Pat. No. 3,424,718 (Example 5). The 2,2-3',4'-F6DA can be made by those skilled in the art following reported procedures, e.g., those of Netherlands patent application No. 6,406,896 (published Dec. 18, 1964 (CA 62: 145856 (1965)). The procedure is described in more detail in U.S. Pat. No. 4,612,361.

The 6FDA can be used with other dianhydrides such as the oxydiphthalic anhydrides (ODPA) and the biphenyl tetracarboxylic dianhydrides (BPDA).

The oxydiphthalic anhydrides include 3,3'-oxydiphthalic anhydride; 3,4'-oxydiphthalic anhydride; and 4,4'oxydiphthalic anhydride (4,4'-ODPA), the latter being the most preferred compound.

The BPDA's include 1,1',3,3'-biphenyl tetracarboxylic dianhydride, 2,3,3',4'-biphenyl tetracarboxylic dianhydride and 3,3'4,4'-biphenyl tetracarboxylic dianhydride (3,3'4,4'-BPDA), the latter being the most preferred compound.

When ODPA is used, the molar ratio is generally in the range of about 9 parts of 6FDA to 1 part ODPA to about 0.1 part of 6FDA to 1 part of ODPA. When BPDA is used, the molar ratio is generally in the range of about 9 parts 6FDA to 1 part of BPDA to about 0.5 part of 6FDA to 1 part of BPDA.

Other organic dianhydrides can be employed in small proportions, up to about 5 to about 20 weight percent of the 6FDA.

The other organic dianhydrides include compounds having the following general formula:

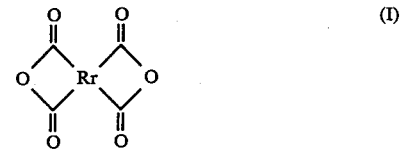

wherein Ar is

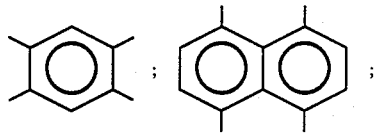

wherein Y is —S—,

$C_nH_{2n}$.

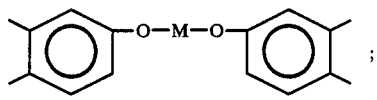

wherein M is phenylene or

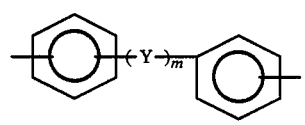

wherein Y is —O—, —S—,

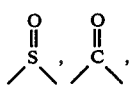

$C_nH_{2n}$, $C(CF_3)_2$, and m=O or 1.

Specific examples are diether dianhydrides which ave the formulas:

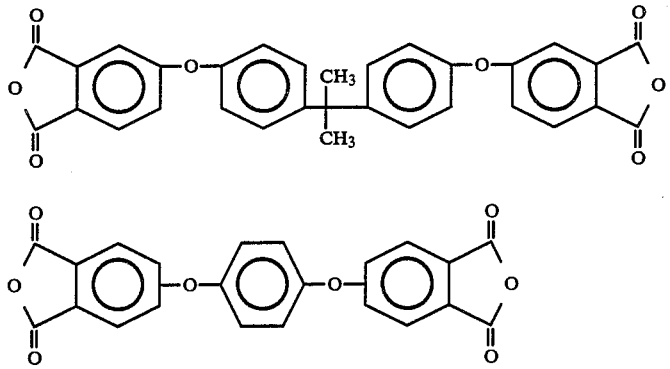

Other examples of such other dianhydrides are disclosed in U.S. Pat. Nos. 4,395,527 and 4,586,997, the disclosures of which are incorporated herein by reference. However, even though the incorporation of these dianhydrides may alter only slightly the solubility of the resulting polyimidesiloxanes in NMP or diglyme, these modified polyimidesiloxanes may become insoluble in solvents, such as MEK or THF. This limits their applications where a very low boiling, non-toxic solvent such as MEK is required. In addition, the incorporation of the diether dianhydrides (DEDA) such as those of the formula II, also reduces the glass transition temperature and thermal stability of polyimidesiloxanes of the invention and limit their upper use temperatures. Thus only up to about 5 weight percent of PMDA, and only up to about 20 weight percent of the diether dianhydrides (DEDA) can be employed in the composition of the invention.

The Organic Diamines

It has been found that diamines that provide asymmetrical structure in the polyimidesiloxane chains are especially useful in combination with the oxydiphthalic anhydrides in making polyimidesiloxanes with the desirable and superior properties of this invention.

Suitable diamines that provide asymmetrical structure in the polyimidesiloxane chain have the following formula:

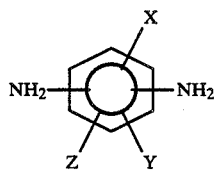

where x, y and z are independently selected from hydrogen, halogen, alkyl or halogenated alkyl of 1 to 12 carbon atoms or aryl or halogenated aryl of 6 to 12 carbon atoms, provided that all of x, y and z are not hydrogen. The preferred diamines have at least one alkyl substituent having at least one carbon atom.

Examples are:
2,4-tolyldiamine
2,5-tolyldiamine
2,6-tolyldiamine
m-xylyldiamine
2,4-diamine-5-chloro toluene
2,4-diamine-6-chloro toluene
trifluoromethyl-2,4-diaminobenzene 2,4,6-trimethyl 1,3-diaminobenzene Other useful diamine compounds that are asymmetrical in the polymer chain include compounds with the formula:

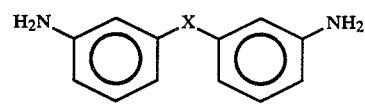

wherein x is —CH$_2$—,

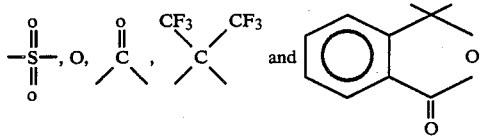

Examples are:
m,m-methylene dianiline
m,m-sulfone dianiline
o,m-sulfone dianiline.

Another suitable diamine that is asymmetrical in the polyimidesiloxane is diaminoanthraquinone.

An especially preferred diamine is a mixture of 2,4-tolyldiamine and 2,6-tolyldiamine, especially the commercially available mixture of about 80 weight percent 2,4-tolyldiamine and about 20 weight percent 2,6-tolyldiamine.

Small amounts up to about 25 weight percent of diamines that are not assymetrical in the polymer chain can be employed in the polyimidesiloxane compositions. Such other diamines are disclosed in U.S. Pat. Nos. 4,395,527 and 4,586,997, the disclosures of which are incorporated herein by reference.

Such auxiliary diamines have the formula

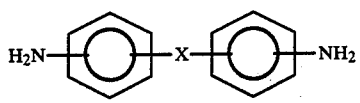

wherein x is preferably

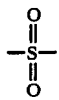

for retaining solubility in diglyme, THF or MEK. In addition, the x can also be

—O—, —S— and —CH$_2$— for achieving only solubility in NMP. Additional organic diamines can be employed in much smaller quantities without affecting the favorable combinations of thermal stability glass transition temperature and solubility can be found.

The Siloxane Monomers

Siloxane diamino compounds that can be used for the present invention have the following formula:

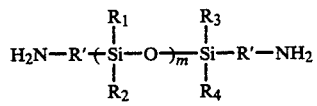

wherein R$_1$, R$_2$, R$_3$, and R$_4$ are independently selected from a substituted or unsubstituted aliphatic mono-radical of 1 to 12 carbon atoms or substituted or unsubstituted aromatic mono-radical of 6 to 10 carbon atoms. Suitable radicals include —CH$_3$, —CF$_3$, —(CH$_2$)$_n$CF$_3$, —C$_6$H$_5$, —CF$_2$—CHF—CF$_3$ and —CH$_2$—CH$_2$—C—O—CH$_2$CF$_2$CF$_2$CF$_3$.

R' is a di-radical of the foregoing type. Suitable di-radicals include

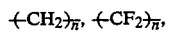

—(CH$_2$)$_n$(CF$_2$)$_m$— and —C$_6$H$_4$—, wherein m and n=1 to 10.

The employment of an α,w-diaminosiloxane is important for achieving the desired solubility in diglyme, THF or MEK in the present invention when the essential dianhydride employed in the invention is 6FDA. The siloxane diamine also provides the flexibility or resilience of the polyimidesiloxanes at low temperatures, especially when the m is an integer of more than about 5, or preferably more than about 7. When the m is more than about 50, the incorporation of diaminosiloxane into the polyimidesiloxane becomes difficult even though it is not impossible; and a dual solvent system (one polar and one non-polar solvent) for copolymerization may have to be employed. In general, the employment of the α,w-diaminosiloxane and α,w-dianhydride siloxane are interchangeable in the present invention. However, for making polyimidesiloxanes of high glass transition temperature, the mole percent of the mixture of dianhydrides in the total dianhydride should be maximized; and therefore, it is more desirable to employ the combination of the 6FDA and mixtures thereof, with an organic diamine and an α,w-diaminosiloxane.

Siloxane dianhydrides which can be incorporated instead of or in addition to the siloxane diamines for the practice of the present invention can have the formula:

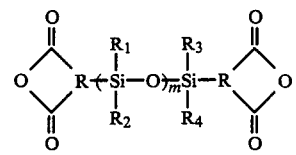

wherein R$_1$, R$_2$, R$_3$ and R$_4$ are independently selected from a substituted or unsubstituted aliphatic mono-radical of 1 to 12 carbon atoms substituted or unsubstituted aromatic mono-radical of 6 to 10 carbon atoms. Suitable radicals include —CH$_3$, —CF$_3$, —(CH$_2$)$_n$CF$_3$, —CF$_2$—CHF—CF$_3$,

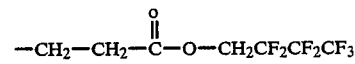

and —C$_6$H$_5$.

R is a tri-radical of the foregoing type. Suitable tri-radicals include —CH<,

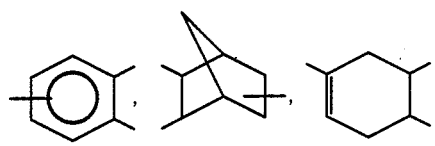

When a dianhydride other than the 6FDA is employed, their solubility in various solvents, glass transition temperatures and thermal stability changes depending on the chemical nature of these co-monomers. For instance, when a siloxane dianhydride is incorporated in the presence of 6FDA, the solubility of the polymer increases, while the glass transition temperature and thermal stability will be lowered. Therefore, depending on the requirements for applications, the incorporation of siloxane dianhydride may become unfavorable. On the other hand, when an organic dianhydride such as PMDA is added in small proportions of less than 5 mole percent, the resulting 6FDA-containing polyimidesiloxanes still has the desirable solubility in, for instance, NMP. The incorporation of PMDA can increase the glass transition temperature and thermal stability of the resulting 6FDA-containing polyimidesiloxanes, and, therefore, can provide more favorable products for extrusion or injection molding applications. However, one may also find that even with a small amount of PMDA in the 6FDA-containing polyimidesiloxanes, the resulting copolymers may become insoluble in solvents, such as diglyme, THF or MEK, and their applications as coating materials will be limited, for instance, in heat sensitive electronic devices or substrates.

The Process For Soluble Polyimidesiloxanes

Although the chemistry for reactions of organic diamines with organic dianhydrides has become well-known, the preparation of polyimidesiloxanes in the presence of the siloxane comonomers may sometimes require special techniques. For instance, when the repeating unit m, of the siloxane monomer is larger (i.e., >20 to 40), it may be desirable to use a dual solvent system: i.e., a solvent system consisting not only of a polar solvent, but also a less polar solvent. (See, for instance, McGrath et al, Polymer Preprints, 27 (2), 1986, pp. 403). It is also known that in the practice of making soluble polyimides, if a polyimide is soluble in a given solvent, in which the polyamide acid is not soluble, one can prepare the polyimide directly in a one step polymerization process, that is, by a simultaneous imidization and polycondensation process, referred to as the one-step process. This procedure can be advantageous, especially when a desirable polymer solution for coating applications has to be made out of a given solvent in which the polyamide acids are not soluble. The problem with the simultaneous imidization and polycondensation is that the depolymerization of the polyamide acid in the presence of the water which is produced during the imidization step, can be very severe. Theoretically, the depolymerization can become an irreversible process, since it produces a dicarboxylic acid and an amino compound. The carboxylic acid reacts with amino compounds at much higher temperatures as compared to the almost instantaneous reaction of the dianhydrides with the amino compounds at room temperature. The depolymerization of polyamide acids can become very severe at high temperatures. This one-step process often produces polyimidesiloxanes with much lower molecular weight as compared to those produced in a good solvent, in which the polyamide acid and the imidized polymers are both soluble, and one employs a two-step process. The two-step process employs a low temperature polycondensation step which generates very high molecular weight polyamide acid and then a very fast heating step to imidize and remove water generated from imidization.

The two-step process produces higher molecular weight materials which have higher thermal stability and mechanical strength, especially higher elongation at break. The polycondensation temperature for the two-step process should be below 60° C., preferably below room temperature. The imidization can be carried out at temperatures from 90° C. to 180° C., or the refluxing temperature of the solvents. When the boiling temperature of the desirable solvent for imidization is below 160° C., the use of dehydrating agents and/or a base catalyst is desirable. A suitable dehydrating agent is acetic anhydride. The catalyst is a tertiary amine, such as pyridine. When the acetic anhydride is employed, lower imidization temperatures can be employed to complete the imidization. In addition, an azeotropic agent with water can also be added to the reactor. The use of an azeotropic agent such as toluene can facilitate the removal of water presented in the reactor and minimize the depolymerization of the polyamide acids. When an azeotropic agent is employed, a continuous recovery of fresh azeotropic agent can be achieved by using also a Dean Stark trap under the condenser.

The degree of polycondensation is important for obtaining good thermal and mechanical properties in making polyimidesiloxanes. The reaction time for making high molecular weight polyimidesiloxanes is normally several times longer than that required for making polyimides due to the fact that the reactivity of the $\alpha,w$-diamino or dianhydride siloxanes is normally lower than organic monomers. In general, the high molecular weight siloxane monomers, react much slower than the organic monomers in a polar solvent. Accordingly, one can also expect that the microstructure of the polyimidesiloxane depends not only on the molar ratio of the organic to siloxane monomers (or the composition of the monomers), but also on the additional sequence of these monomers during polycondensation. For instance, when a high molecular weight $\alpha,w$-diamino siloxane is employed, one sometimes finds that it is advantageous to first react the organic dianhydride without the presence of the organic diamine. This procedure not only can overcome the need of using a dual solvent system, but also can result in a much more uniform and controllable polyimide block size and distribution. Compared to a polyimidesiloxane with identical chemical make-up, but prepared with a different addition sequence (i.e., add all monomer together into a solvent at once) the polyimidesiloxane with more uniform and controlled imide size and distribution have a more soluble characteristic toward siloxane-like solvent or non-polar solvent. On the other hand, polyimidesiloxanes have the identical number average molecular weight of imide-block but having a broad molecular weight distribution will be less soluble in the diglyme or THF.

Depending on the property requirements for various applications, one can therefore design polyimidesiloxanes by their composition, but also control their microstructures through monomer addition sequence for one's advantage.

The solvents that can be used for the polymerization of the present invention are the phenol solvents; N,N-dialkylated carboxylamide solvents and monoalkylated or dialkylated ether type solvents. The examples of phenol solvents are phenol, o-cresol, m-cresol, o-chlorophenol, m-chlorophenol, p-fluorophenol, 2,4,6-tribromophenol; examples of N,N-dialkylated carboxylamide solvents are N,N-dimethylformamide, N,N-dimethylacetamide, NMP; ether type solvents are tetrahydrofuran (THF), or diglyme. Other solvents such as sulfolane, dimethylsulfoxide and chlorinated benzenes such as p-dichloro benzene which are commonly mentioned in various polyimide patents can also be used.

Polyimidesiloxane can also be prepared in a melt polymerization process; especially when the glass transition temperature of the imide block is lower than say about 200° C.; or a large proportion (>25%) of the siloxane comonomers is employed. In practice, the melt polycondensation can be done in an extruder in which imidization can be achieved using a vented zone situated close to the outlet nozzle.

To achieve high molecular weight polyimidesiloxanes, the total moles of dianhydride component(s) should equal the total moles of diamine component(s). To reduce the molecular weight an excess of dianhydride, diamine components or small amounts of monofunctional compounds can be employed.

When the siloxane monomer is a diamine, for every 1 mole of siloxane diamine employed, assume that n moles of organic diamine is employed. Then n+1 moles or organic dianhydride is employed.

When the siloxane monomer is a dianhydride, for every 1 mole of siloxane dianhydride employed, assume that n moles of organic dianhydride is employed. Then n+1 moles of organic diamine must be employed.

In the foregoing cases, n has a value of greater than 0.01 but no more than 40, preferably 20.

When $0.01 \leq n \leq 0.1$, the polyimidesiloxane exhibit elastomeric or rubber properties and are useful for potting, encapsulation, and sealing applications. Especially, a cross-linking elastomeric polyimidesiloxane will have great value in the above-mentioned applications. When $0.1 \leq n \leq 10$, polyimidesiloxanes with thermoplastic elastomeric properties are obtained. These materials are useful for wire, cable, injection molding and protective coating applications. When $10 \leq n \leq 40$, very high strength and rigid thermoplastics are produced which are useful for molding and coating applications.

The Curable Polyimidesiloxanes

The soluble polyimidesiloxanes described above have many valuable properties and uses. However, limitations are found in their applications, especially in areas where higher chemical or creep resistance are desirable or even critical. For instance, most of the polyimidesiloxanes show limited hydraulic fluid or jet fuel resistance when their siloxane content is over 30 to 40%. Even though this weakness can be largely reduced by incorporating fluorinated compound into their backbone structure, in particular, into their siloxane blocks, it is still more desirable to convert these fluorinated polyimidesiloxanes into thermosets in order to achieve higher solvent and creep resistance. In general, when a cross-linkable polyimidesiloxane carries an acrylic functionally, it can be cured by either thermal or photomethod. A photosensitive or photocurable polyimidesiloxane is especially valuable for patterning applications in microchips or integrated circuit industries. Furthermore, these novel curable polyimidesiloxanes, as well as the soluble polyimidesiloxanes, can also find applications in passivation layer, alpha particle barrier, electron beam patterning, ion implant mask or interlayer dielectric in electronics and microelectronic industries.

The polyimidesiloxanes of the invention can be made curable by the inclusion of reactants that have functionalities that are capable of being cross-linked, or that have intermediate functionalities that can be suitably modified with cross-linkable moieties after formation of the polymer. The required functionalities can be incorporated into the polymer of the invention by use of suitable diamines and/or siloxane compounds.

The diamine compounds have the characteristic described for the soluble polymers of a diamine that provide assymetrical structure in the polyimidesiloxane chains. The diamines further have the following general formula:

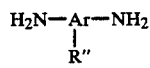

wherein Ar is aromatic, R'' is a hydroxyl, hydrothiol or carboxylic radical, preferably a hydroxyl or carboxylic radical. The typical examples of these compounds are, for instance, 3,5-diaminobenzoic acid and 3,5-di-aminophenol, and the like.

The functionalized siloxane diamines or dianhydrides have the following general structure:

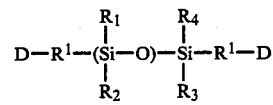

wherein D is either an amino or anhydride group and the $R^1$ is a diradical R' or a triradical R, such as described hereinbefore. Radicals $R_1$, $R_2$, $R_3$ and $R_4$ are described hereinbefore, except that one or more of $R_1$, $R_2$, $R_3$ and $R_4$ can be a halogen, hydride (H), vinyl or a hydroxyl group, when D is an anhydride group; or vinyl or hydroxyl when D is an amino group.

Examples of the functionalized siloxane $\alpha,\omega$-diamino compounds can be the following:

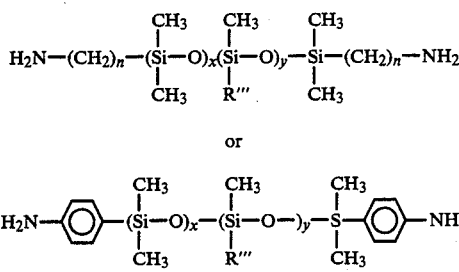

wherein n is an integral from 2 to 6, preferably 3 and 4; and R''' is a vinyl or hydroxyl group, and $x+y=1$ to 100, preferably 4–40 and y is an integer of 1 to 15, preferably 1 to 5.

The examples of the functionalized dianhydride are:

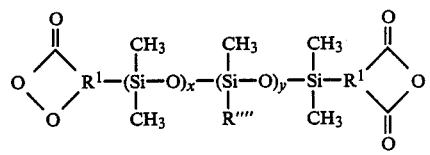

where $R^1$ is

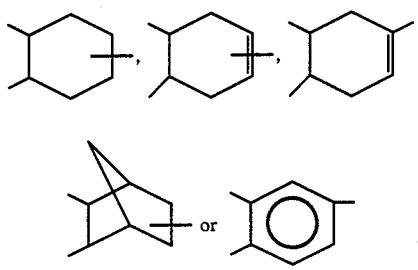

and R'''' is selected from hydride (H), hydroxyl, halogen and vinyl groups, preferably the H and vinyl groups. The x and y have the same meanings as above.

The Process for Making Curable Polyimidesiloxanes

The procedures for making soluble polyimidesiloxanes are generally followed.

The comonomers are generally copolymerized in an appropriate solvent such as NMP or diglyme. The fully imidized, polyimidesiloxane which carries at least one kind of the functionalities described above, can then be further reacted or grafted with an acetylinic, ethylenic or acrylic-bearing compound to provide the final products desired for this invention. The grafting reaction is preferably conducted in a non-reactive solvent, preferably in diglyme, THF or MEK. Since there are many different functional groups that can be selected for the functionalized polyimidesiloxane, the grafting reaction desired for this invention has to be varied accordingly. For instance, when a carboxylic or hydroxyl-containing polyimidesiloxane is first prepared, the grafting of an acrylic group can be achieved by using either an epoxy-bearing acrylate such as the

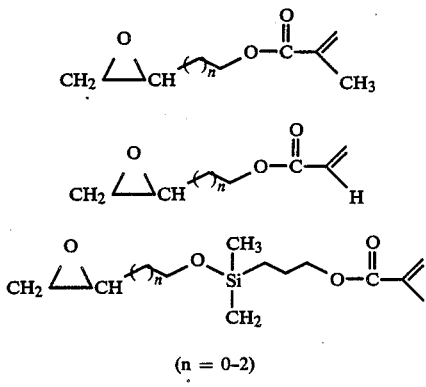

(n = 0-2)

or an isocyanate-bearing acrylate such as

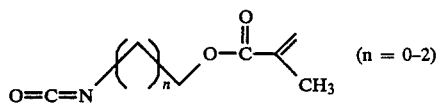

(n = 0-2)

When the functional group of the polyimidesiloxane is located in the siloxane blocks, the grafting reaction can be achieved using either an hydrosilylation reaction or a condensation reaction. For instance, when a

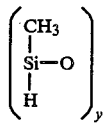

group is present in a polyimidesiloxane, the grafting can be achieved via hydrosilylation: i.e., reaction of a vinyl group with a Si—H group in the presence of a catalyst, such as a Pt catalyst. Therefore grafting of a

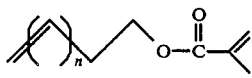

compound results in an acrylate-bearing polyimidesiloxane. When a —OH or epoxy group is present in the polyimidesiloxane, on the other hand, the grafting can be achieved via a condensation reaction. For instance, the reactions of an isocyanate-bearing acrylate or an acrylic acid or methylacrylic acid with the hydroxyl or epoxy group on the polyimidesiloxane can result in an acrylic- bearing polyimidesiloxane desired for the present invention.

When an acetylenic-bearing compound also bears a carboxylic, an epoxy or isocyanato functionality, it is clear that the compounds can be grafted onto a polyimidesiloxane which carries an —OH or, a carboxylic group, respectively.

When an ethylenic group is present in the siloxane block of the polyimidesiloxane, it can be used as such, and further be cured thermally via free radical cross-linking reactions or can be further changed into polyimidesiloxanes which carry either an acrylic or an acetylinic group. The grafting reaction of this kind is difficult to achieve, however, due to the lack of appropriate chemicals.

To prepare the functionalized polyimidesiloxanes with a functional group presented in the imide block, it is preferred to start with an OH or —COOH-bearing diamino compound. On the other hand, this kind of siloxane monomer is usually not readily available. The incorporation of epoxy, silicone hydride or silicone hydroxyl group can be achieved via equillibration of the α,w-diamino or α,w-dianhydride siloxane with cyclic silicone epoxy, silicone hydride or silicone hydroxy compounds. In any event, it is preferred to graft the acrylic or ethylenic or acetylenic group rather than using an acrylic, ethylenic or acetylenic diamino or dianhydride compound for making the desired polyimidesilocane. This is to avoid thermally cross-linking reactions of these functionalities during imidization of the polyimidesiloxane at high temperatures (about 160° to 170° C./2 hrs in solvent). A grafting reaction of a fully imidized polyimidesiloxane with the above described functionalities can be, in general, carried out at much lower temperatures. For instance, the hydrosilylation can be carried out at temperatures as low as 25° C. in the presence of a platinum catalyst. The condensation between the —OH or carboxylic group with the epoxy group can be achieved at temperatures of no more than 120° C., within hours with the presence of a tertiary amine as a catalyst, while the reaction of an OH or carboxylic group with an isocyanate group needs even lower temperatures (RT to 80° C.), and the like.

To avoid the need for isolation of the reaction product from solvent, it is desirable to conduct the grafting reaction in the solvent which is acceptable for coating operations. The desirable solvents of these kinds are solvents with low flammability and/or toxicity, such as diglyme or MEK. The latter has been widely employed in coating industries due to its low boiling temperature.

In this specification and claims halogen shall refer to fluorine, chlorine, bromine and iodine, but preferably to fluorine and chlorine. Aromatic generally refers to hydrocarbon aromatic.

In the following examples and throughout the specification and claims, parts are by weight and temperatures are in degrees Celsius, unless indicated otherwise.

EXAMPLES

Example 1

Into a 150 ml Erlenmeyer flask was loaded 4.42 grams of 2,2-3',4'-6FDA and 25 ml of 1-methyl-2-pyrrolidinone (NMP). The mixture was mixed with magnetic stirrer for 30 minutes. Then 2.0 grams of p,p-oxydianiline (ODA) was added and the reaction was conducted for 16 hours. The resulting solution was cast in a Teflon mold at 145° C.±5° C. for 4 hours, then at 250° C. for 0.5 hour. Brittle films were obtained. The product was designated by the formula $[FO]_n$.

EXAMPLE 2

Example 1 was repeated by using 4.42 grams of 2,2-3′,4′-6FDA and 1.22 grams of 2,4-tolyldiamine (2,4-TDA). The product formed brittle films and was designated by the formula $(FT)_n$.

Example 3

Into a 150 ml Erlenmeyer flask was loaded 4.44 grams of 2,2-3′,4′-6FDA and 25 ml of N-methyl pyrrolidone (NMP). The mixture was mixed with magnetic stirrer for 30 minutes. Then 1.65 grams of the siloxane $G_{8.75}$ was added to the mixture, and the reaction was continued for 2 hours. Then 0.976 grams of 2,4-tolyldiamine (2,4-TDA) was added and the reaction was conducted for 16 hours. The resulting solution was cast in a Teflon mold at 145° C.±5° C. for 4 hours, then at 250° C. for 0.5 hour. Flexible films were obtained. The product was designated by the formula $[(FT)_4G_{8.75}]$.

EXAMPLE 4

Example 3 was repeated by using 4.41 grams 2,2-3′,4′-6FDA, 2.48 grams of siloxane $G_{8.75}$ and 0.842 grams of 2,4-TDA. The resultant products were flexible films. The product was designated by the formula $[(FT)_{2.3}G_{8.75}]$.

Example 5

Example 3 was repeated by reacting 2.94 grams of 3,3′,4,4′-BPDA first with 4.13 grams of siloxane $G_{8.75}$ for 2 hours, then with 2.22 grams of 2,2-3′,4′-6FDA for another 2 hours, then finally with 1.22 grams of 2,4-TDA for 16 hours. The resultant products formed flexible films. The products were designated by the formula $[(F_{\frac{1}{2}}B'_{\frac{1}{2}}T)_2G_{8.75}]$.

Example 6

Example 5 was repeated by using 2.96 grams of 2,2-3′,4′-6FDA, 1.96 grams 3,3′,4,4′-BPDA, 2.75 grams $G_{8.75}$ and 1.22 grams of 2,4-TDA. The reaction product formed flexible films and was designated as $(F_{\frac{1}{2}}B'_{\frac{1}{2}}T)_3G_{8.75}$.

Example 7

Example 3 was repeated by using 2.96 grams of 2,2-3′,4′-6FDA, 4.13 grams of $G_{8.75}$, 4.14 grams of 4,4′-ODPA (oxydiphthalic anhydride) and 1.83 grams of 2,4-TDA. The resultant products formed flexible films. The products were designated by the formula $[(F_{\frac{1}{2}}O_{\frac{1}{2}}T)_3G_{8.75}]$.

Example 8

Example 3 was repeated by using 1.31 grams of 2,2-3′,4′-6FDA, 1.90 grams of 3,3′,4,4′-BTDA, 2.43 grams of siloxane $G_{8.75}$ and 0.722 grams of 2,4-TDA. The resulting products formed flexible films. The products were designated by the formula $[(F_{\frac{1}{2}}B_{\frac{1}{2}}T)_2G_{8.75}]$.

EXAMPLE 9

Example 5 was repeated by using 12.91 grams of 4,4′-ODPA, 10 grams of $G_{8.75}$ and 3.634 grams of 2,4-TDA. The resulting products formed flexible films. The products were designated by the formula $(OT)_{2.5}G_{8.75}$.

In the foregoing examples, $G_m$ has the formula:

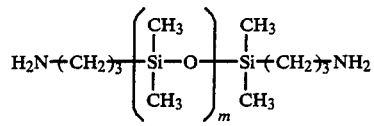

where m indicates the number of repeating units, as shown in Table 1, for example, $G_{8.75}$.

TESTING FOR SOLUBILITY

To 3 ml of diglyme, about 0.3 gram of sample is loaded and then heated to 70° to about 90° C. for 2–16 hours. The solubility is recorded and tabulated as shown in Table 1.

TABLE 1
SOLUBILITY OF 6FDA CONTAINING POLYIMIDESILOXANES

| Example No. | Compositions | Solubility/Diglyme |
|---|---|---|
| 1 | $(FO)_n$ | Yes |
| 2 | $(FT)_n$ | Yes |
| 3 | $(FT)_4G_{8.75}$ | Yes |
| 4 | $(FT)_{2.3}G_{8.75}$ | Yes |
| 5 | $(F_{\frac{1}{2}}B'_{\frac{1}{2}}T)_2G_{8.75}$ | Yes |
| 6 | $(F_{\frac{1}{2}}B'_{\frac{1}{2}}T)_3G_{8.75}$ | Yes |
| 7 | $(F_{\frac{1}{2}}O_{\frac{1}{2}}T)_3G_{8.75}$ | Yes |
| 8 | $(F_{\frac{1}{2}}B_{\frac{1}{2}}T)_2G_{8.75}$ | No |
| 9 | $(OT)_{2.5}G_{8.75}$ | Yes |

Several of the products of the foregoing Examples were subjected to a temperature of 400° C. for one hour in a nitrogen atmosphere in a thermogravemetric analyzer. The weight loss was determined and is reported in Table 2.

TABLE 2

| Example No. | Weight Loss (Percent) |
|---|---|
| 2 (control) | 9.0 |
| 6 | 4.2 |
| 7 | 6.5 |
| 9 (control) | 10.3 |

The solubility of the polyimidesiloxanes of the invention in low boiling, non-polar solvents, such as THF or diglyme is a function of the proportion of the siloxane component in the polyimidesiloxane and is also a function of the siloxane block size.

The polyimidesiloxanes of the invention are useful in a variety of applications in the micro-electronic industry. Such applications include use in the form of coatings as dielectrics and/or for passivations for semiconductors and thin film hybrids. Coatings of the polyimidesiloxanes can be used in the fabrication of semiconductor devices in the following areas: (a) as a protective overcoat, (b) as an interlayer dielectric for multi-level devices, (c) as an alpha particle barrier, and (d) as a non-implant mask. These uses are described in detail by Lee and Craig in Polymer Materials for Electronic Applications, ACS Symposium, Ser. 184, page 108.

Other uses for the polyimidesiloxanes of the invention include wire and cable coatings, in fibers and films, and molded and extruded articles.

I claim:

1. In a substantially fully imidized polyimidesiloxane comprising the reaction product of an organic dianhydride, a difunctional siloxane monomer, and an organic diamine, the improvement wherein the polyimidesiloxane is soluble in diglyme and the organic dianhydride comprises a bis(dicarboxyphenyl)hexafluoropropane dianhydride (6FDA) as the sole essential organic dianhydride, and the organic dianhydride is free of polyether linkage.

2. The polyimidesiloxane of claim 1 wherein the organic dianhydride is 2,2-bis(3',4'-dicarboxylphenyl)hexafluoropropane dianhydride.

3. The polyimidesiloxane of claim 1 which also comprises an oxydiphthalic anhydride (ODPA) wherein the molar ratio of 6FDA to ODPA is in the range of about 9 parts of 6FDA to 1 part ODPA to about 0.1 part of 6FDA to 1 part of ODPA.

4. The polyimidesiloxane of claim 3 wherein the ODPA is 4,4'-oxydiphthalic anhydride.

5. The polyimidesiloxane of claim 1 which also comprises a biphenyl tetracarboxylic dianhydride (BPDA) wherein the molar ratio of 6FDA to BPDA is in the range of about 9 parts of 6FDA to 1 part of BPDA to about 0.5 part of 6FDA to 1 part of BPDA.

6. The polyimidesiloxane of claim 5 wherein the BPDA is 3,3',4,4'-biphenyl tetracarboxylic dianhydride.

7. The polyimidesiloxane of claim 1 wherein the organic diamine provides an asymmetrical structure in the polyimidesiloxane polymer chain.

8. The polyimidesiloxane of claim 1 wherein the organic diamine has the formula

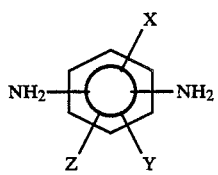

wherein x, y and z are independently selected from hydrogen, halogen, alkyl or halogenated alkyl of 1 to 12 carbon atoms or aryl or halogenated aryl of 6 to 12 carbon atoms, provided that all of x, y and z are not hydrogen.

9. The polyimidesiloxane of claim 8 wherein x, y and z are independently selected from hydrogen, halogen, alkyl of 1 to 12 carbon atoms or aryl of 6 to 12 carbon atoms, provided that all of x, y and z are not hydrogen.

10. The polyimidesiloxane of claim 1 wherein the organic diamine is 2,4-tolyldiamine, 2,6-tolyldiamine or a mixture thereof.

11. The polyimidesiloxane of claim 1 wherein the organic diamine is a mixture of about 80 weight percent 2,4-tolyldiamine and about 20 weight percent 2,6-tolyldiamine.

12. The polyimidesiloxane of claim 1 wherein the organic diamine has the formula

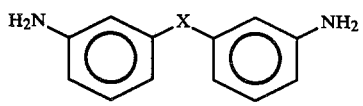

wherein x is —CH$_2$—,

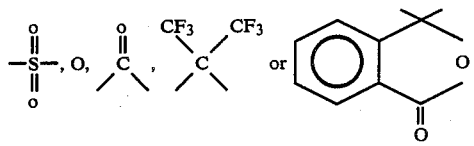

13. The polyimidesiloxane of claim 1 wherein the organic diamine is p,p-oxydianiline, or m,m-methylene dianiline.

14. The polyimidesiloxane of claim 12 wherein the organic diamine is a 3,3'-sulfone dianiline.

15. The polyimidesiloxane of claim 12 wherein the organic diamine has the formula

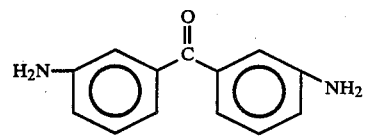

16. The polyimidesiloxane in claim 1 wherein at least a portion of the organic diamine has the formula

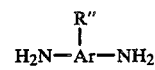

wherein Ar is an aromatic radical, and R" is at least one of hydroxyl, carboxyl, or hydrothiol.

17. The polyimidesiloxane of claim 16 wherein R" is carboxyl.

18. The polyimidesiloxane of claim 1 wherein at least a portion of the organic diamine component has the formula

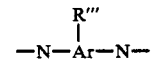

wherein Ar is an aromatic radical, and R''' is at least one of an acrylic-, an ethylenic- or an acetylenic-bearing radical.

19. The polyimidesiloxane of claim 1 wherein the siloxane monomer is a siloxane diamine.

20. The polyimidesiloxane of claim 19 wherein the siloxane diamine has the formula

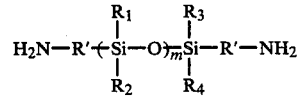

wherein R' is independently selected from substituted or unsubstituted aliphatic difunctional radicals of 1 to 12 carbon atoms, or substituted or unsubstituted aromatic difunctional radicals of 6 to 10 carbon atoms, and wherein none or one or more of $R_1$, $R_2$, $R_3$ and $R_4$ are vinyl, hydroxyl, acrylic-, ethylenic-, or acetylenic-bearing radicals, and the remainder of $R_1$, $R_2$, $R_3$ and $R_4$ are independently selected from substituted or unsubstituted aliphatic monofunctional radicals of 1 to 12 carbon atoms, or substituted or unsubstituted aromatic monofunctional radicals of 6 to 10 carbon atoms, and m is a number from about 5 to about 200.

21. The polyimidesiloxane according to claim 20 wherein R₁, R₂, R₃, and R₄ are methyl groups.

22. The polyimidesiloxane according to claim 21 wherein R' is (CH₂)₃.

23. The polyimidesiloxane of claim 20 wherein at least a portion of a siloxane diamine comprises a diamine wherein at least one of R₁, R₂, R₃ and R₄ is a radical selected from hydroxyl or vinyl.

24. The polyimidesiloxane according to claim 23 wherein at least one of R₁, R₂, R₃ and R₄ is vinyl and the remainder are methyl groups.

25. The polyimidesiloxane according to claim 24 wherein the R' is (CH₂)₃.

26. The polyimidesiloxane of claim 20 wheren at least a portion of the siloxane diamine comprises a siloxane diamine component wherein at least one of R₁, R₂, R₃ and R₄ is a radical selected from acrylic-, ethylenic- or acetylenic-bearing radicals.

27. The polyimidesiloxane of claim 26 having an acrylic-bearing radical.

28. The polyimidesiloxane of claim 1 wherein the siloxane monomer is a siloxane dianhydride.

29. The polyimidesiloxane of claim 28 wherein the siloxane dianhydride has the formula

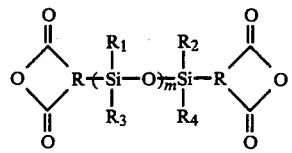

wherein R is a substituted or unsubstituted aliphatic trifunctional radical of 1 to 12 carbon atoms, or a substituted or unsubstituted aromatic trifunctional radical of 6 to 10 carbon atoms, and wherein none or one or more of R₁, R₂, R₃ and R₄ are halogen, hydride (H), vinyl, hydroxyl, acrylic-, ethylenic-, or acetylenic-bearing radicals, and the remainder of R₁, R₂, R₃ and R₄, are independently selected from substituted or unsubstituted aliphatic monofunctional radicals of 1 to 12 carbon atoms, or substituted or unsubstituted aromatic monofunctional radicals of 6 to 10 carbon atoms, and wherein m is about 5 to 50.

30. The polyimidesiloxane of claim 29 wherein R₁, R₂, R₃ and R₄ are methyl groups.

31. The polyimidesiloxane of claim 30 wherein R is

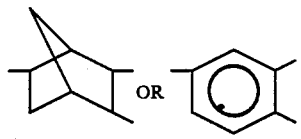

32. The polyimidesiloxane of claim 29 wherein at least a portion of the siloxane dianhydride comprises a dianhydride wherein at least one of R₁, R₂, R₃ and R₄ is a radical selected from hydride (H), halogen, hydroxyl or vinyl.

33. The polyimidesiloxane according to claim 32 wherein at least one of R₁, R₂, R₃ and R₄ is vinyl and the remainder are methyl groups.

34. The polyimidesiloxane according to claim 33 wherein R is

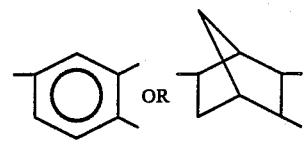

35. The polyimidesiloxane of claim 29 wherein at least a portion of the siloxane dianhydride component comprises a siloxane dianhydride wherein at least one of R₁, R₂, R₃ and R₄ is a radical selected from acrylic, ethylenic or acetylenic radicals.

36. The polyimidesiloxane of claim 35 having an acrylic-bearing radical.

37. A process for producing a polyimidesiloxane that is soluble in diglyme, which comprises reacting an organic diamine, a difunctional siloxane monomer, and an organic dianhydride that consists essentially of a bis(-dicarboxylphenyl)hexafluoropropane dianhydride as the sole essential organic dianhydride and wherein the organic dianhydride is free of polyether linkage.

38. The process of claim 37 wherein the reaction mixture also comprises an oxydiphthalic anhydride.

39. The process of claim 37 wherein the reaction mixture also comprises a biphenyl tetracarboxylic dianhydride.

40. The process of claim 37 wherein the reaction is conducted in a solvent for the polyimidesiloxane.

41. The process of claim 40 wherein the solvent is selected from diglyme, triglyme, 1-methyl-2-pyrrolidinone, tetrahydrofuran, methyl ethyl ketone, phenols or mixtures thereof.

42. The process of claim 37 wherein the siloxane monomer is a siloxane diamine.

43. The process of claim 37 wherein the siloxane monomer is a siloxane diamine having the formula

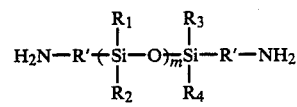

wherein R' is independently selected from substituted or unsubstituted aliphatic difunctional radicals of 1 to 12 carbon atoms or substituted or unsubstituted aromatic difunctional radicals of 6 to 10 carbon atoms, and wherein none or one or more of R₁, R₂, R₃ and R₄ are vinyl, hydroxyl, acrylic-, ethylenic-, or acetylenic-bearing radicals, and the remainder of R₁, R₂, R₃ and R₄ are independently selected from substituted or unsubstituted aliphatic monofunctional radicals of 1 to 12 carbon atoms or substituted or unsubstituted aromatic monofunctional radicals of 6 to 10 carbon atoms, and m is an integer from about 5 to about 50.

44. The process of claim 43 wherein R₁, R₂, R₃ and R₄ are methyl groups.

45. The process of claim 44 wherein R' is (CH₂)₃.

46. The process of claim 37 wherein the siloxane monomer is a siloxane dianhydride.

47. The process of claim 46 wherein the siloxane monomer is a siloxane dianhydride having the formula

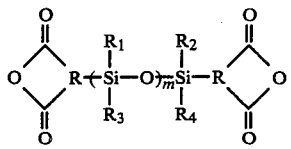

wherein R is a substituted or unsubstituted aliphatic trifunctional radical of 1 to 12 carbon atoms or a substituted or unsubstituted aromatic trifunctional radical of 6 to 10 carbon atoms, and wherein none or one or more $R_1$, $R_2$, $R_3$ and $R_4$ are halogen, hydride (H), vinyl, hydroxyl, acrylic-, ethylenic, or acetylenic-bearing radicals, and the remainder of $R_1$, $R_2$, $R_3$ and $R_4$, are independently selected from substituted or unsubstituted aliphatic monofunctional radicals of 1 to 12 carbon atoms or substituted or unsubstituted aromatic monofunctional radicals of 6 to 10 carbon atoms, and wherein m is about 5 to about 50.

48. The process of claim 47 wherein $R_1$, $R_2$, $R_3$ and $R_4$ are methyl groups.

49. The process of claim 48 wherein R is

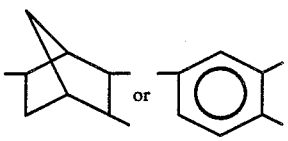

50. The process of claim 37 wherein at least a portion of the organic diamine has the formula $$H_2N-Ar-NH_2$$
with R" substituent wherein Ar is an aromatic radical, and R" is at least one of hydroxyl, carboxyl, or hydrothiol.

51. The process of claim 50 wherein R" is carboxy.

52. The process of claim 43 wherein at least a portion of the siloxane diamine comprises a diamine wherein at least one of $R_1$, $R_2$, $R_3$ and $R_4$ is a radical selected from hydroxyl or vinyl.

53. The process according to claim 52 wherein at least one of $R_1$, $R_2$, $R_3$ and $R_4$ is a vinyl radical, and the remainder are methyl groups.

54. The process according to claim 53 where the R' is $-(CH_2)_3-$.

55. The process according to claim 47 wherein at least a portion of the siloxane dianhydride of the formula comprises a dianhydride wherein at least one of $R_1$, $R_2$, $R_3$ and $R_4$ is a radical selected from hydride (H), halogen, hydroxyl, or vinyl.

56. The process according to claim 55 wherein at least one of $R_1$, $R_2$, $R_3$ and $R_4$ is vinyl and the remainder are methyl groups.

57. The process according to claim 56 wherein R is

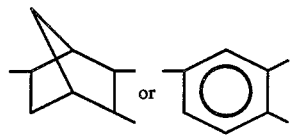

58. The process according to claim 50 wherein the product of the process is reacted with a compound having at least one of an acrylic-, an ethylenic- or an acetylenic-bearing radical.

59. The process of claim 52 wherein the product of the process is reacted with a compound having at least one of an acrylic-, an ethylenic- or an acetylenic-bearing radical.

60. The process of claim 55 wherein the product of the process is reacted with a compound having at least one of an acrylic-, an ethylenic- or an acetylenic-bearing radical.

61. A solution comprising the polyimidesiloxane of claim 1 dissolved in a solvent for the polyimidesiloxane.

62. The solution of claim 61 wherein the solvent is selected from diglyme, triglyme, 1-methyl-2-pyrrolidinone, tetrahydrofuran, methyl ethyl ketone, phenols or chlorinated solvents.

63. An article comprising a substrate coated with the polyimidesiloxane according to claim 1.

64. An article of claim 63 wherein the substrate is a wire or cable.

65. A film prepared from the polyimidesiloxane according to claim 1.

66. A fiber prepared from the polyimidesiloxane according to claim 1.

67. A molded article prepared from the polyimidesiloxane according to claim 1.

68. An extruded article prepared from the polyimidesiloxane according to claim 1.

69. A cured composition of claim 1.

70. A cured composition of claim 26.

71. A cured composition of claim 35.

* * * * *

UNITED STATES PATENT AND TRADEMARK OFFICE
CERTIFICATE OF CORRECTION

PATENT NO. : 4,853,452
DATED : August 1, 1989
INVENTOR(S) : Chung J. Lee

It is certified that error appears in the above-indentified patent and that said Letters Patent is hereby corrected as shown below:

> Title page, after "[22] Filed: Feb. 9, 1988"
> insert --Related U.S. Application Data
> [63] Continuation-in-part of Serial No. 32,272,
> Mar. 31, 1987, abandoned--

Signed and Sealed this

Sixteenth Day of November, 1993

Attest:

BRUCE LEHMAN

Attesting Officer        Commissioner of Patents and Trademarks